United States Patent [19]

Tiefensee

[11] Patent Number: 4,633,458
[45] Date of Patent: Dec. 30, 1986

[54] DISC-SHAPED, OPTICALLY-READABLE INFORMATION CARRIER HAVING A PROTECTIVE EDGE AND/OR CENTER PART

[75] Inventor: Volkmar Tiefensee, Hanover, Fed. Rep. of Germany

[73] Assignee: Polygram GmbH, Fed. Rep. of Germany

[21] Appl. No.: 595,398

[22] Filed: Mar. 30, 1984

[30] Foreign Application Priority Data

Jun. 20, 1983 [DE] Fed. Rep. of Germany ....... 3322131

[51] Int. Cl.⁴ .......................... G01D 15/32; G11B 7/00
[52] U.S. Cl. .................................... 369/275; 346/137; 369/272; 369/280
[58] Field of Search ................ 346/137; 369/275, 272, 369/280; 360/135

[56] References Cited

U.S. PATENT DOCUMENTS

| | | | |
|---|---|---|---|
| 4,074,282 | 2/1978 | Balas, Jr. et al. | 346/138 |
| 4,353,767 | 10/1982 | Wilkinson | 369/175 X |
| 4,462,036 | 7/1984 | Leonard et al. | 346/137 |
| 4,536,869 | 8/1985 | Chandler | 346/135.1 X |

FOREIGN PATENT DOCUMENTS 3127993 7/1981 Fed. Rep. of Germany .
2004404 3/1979 United Kingdom .

Primary Examiner—Robert L. Richardson
Attorney, Agent, or Firm—Hill, Van Santen, Steadman & Simpson

[57] ABSTRACT

High storage density, optically-readable information carriers not only require a read-out side free of contaminants or dust for a faultless reading, but must also be protected against unintentional scratching when being handled on this side. For protection against scratches that usually occur due to dislocation of a disc deposited on its support, concentric elevations are provided that are structured under given conditions by clearances on the read-out side in the edge region and in the central region of the disc outside of the information structure which fills a concentric annular surface. The disc is able to slide on the elevations when deposited on the support without the annular surface, provided with the microstructure, coming into contact with the support.

6 Claims, 6 Drawing Figures

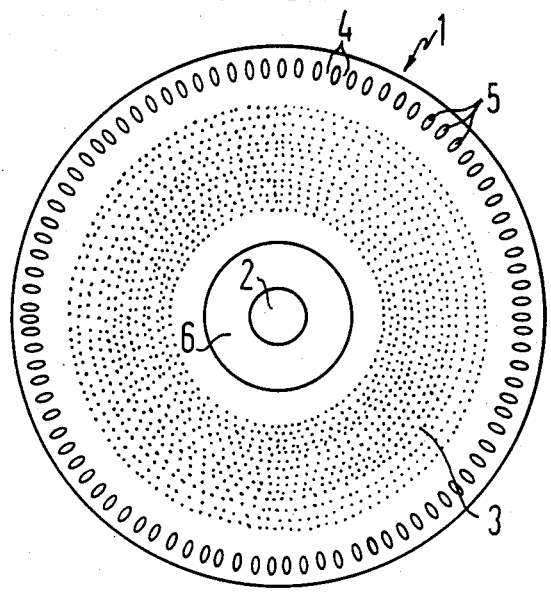
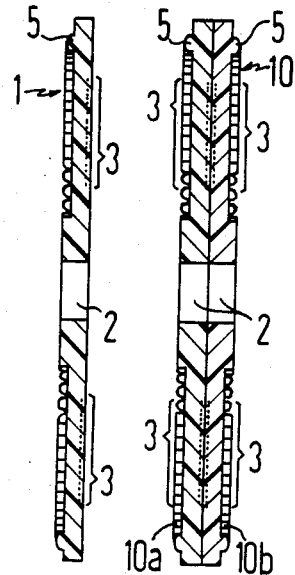
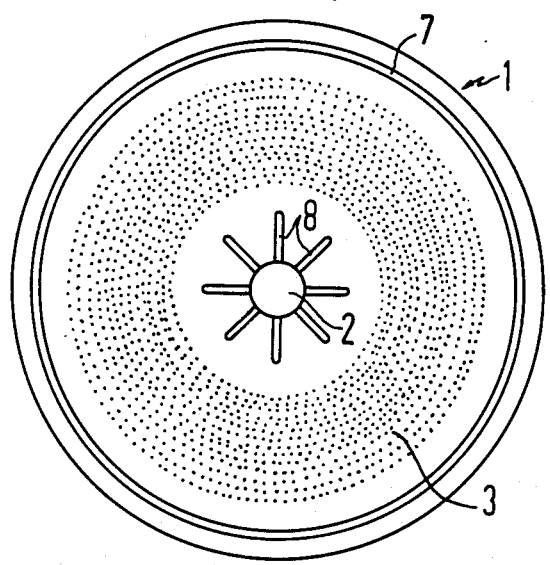
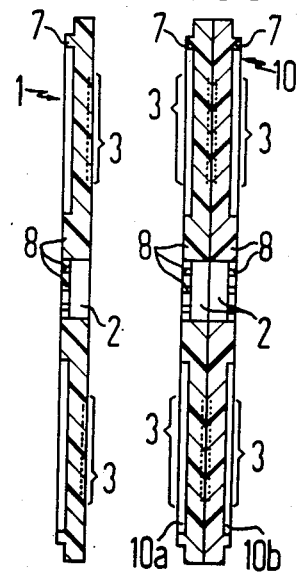

DISC-SHAPED, OPTICALLY-READABLE INFORMATION CARRIER HAVING A PROTECTIVE EDGE AND/OR CENTER PART

BACKGROUND OF THE INVENTION

1. Field of the Invention

The present invention relates to a disc-shaped, high storage density information carrier that is optically readable from one or from both sides in reflection or in transmitted light, whereby the information exhibiting a microstructure is disposed in a concentric, annular surface of the information carrier disc.

2. Description of the Prior Art

Information carrier discs of the type set forth above are known, in general, for example from the German published application No. 28 39 359 which corresponds to the British Pat. No. 2,004,404, both of which are fully incorporated herein by this reference. The microstructure representing the information is impressed into the disc surface on one side of the disc, is provided with a reflective metal layer and covered with a protective layer. The disc is not read at the side having a protective layer, but from the opposite side, this presuming a transparent material for the carrier material in this case. A laser beam is focused in the plane of the information structure so that dust particles and contaminants on the surface of the read-out side of the information disc have a far less disruptive effect and would be the case if reading of the information were to occur on the side of the protective layer covering the information structure.

As the above-mentioned reference also discloses, it is possible to read such an information carrier reflectively from both sides given the combination of two carrier discs carried on the sides of the information structure forming a sandwich disc structure. In addition to such disc-shaped information carriers, optically readable through reflection, embodiments are also known in which the reading occurs by light transmitted therethrough.

As practice has shown, it is not only imperative for a faultless reading of such disc to keep the disc surface on the read-out side as free as possible of dust and other contaminants, rather it is also important that the discs remain scratch-free on the read-out side when manipulated. It is precisely scratches, in particular, that result in the consequence that the light of the laser beam is diffusely reflected in the region of a scratch and, therefore, the reading can be considerably disrupted due to a lack of faultless focusing of the laser beam in the plane of the information structure. In addition, such scratches cannot be subsequently removed.

It is already known from the Japanese published application No. 58-48089, fully incorporated herein by this reference, to provide single-sided, optically-readable, disc-shaped information carriers having an elevated protective edge on the read-out side so that only the protective edge can slide on a support when the disc is deposited on the support.

SUMMARY OF THE INVENTION

The object of the present invention is to improve a disc-shaped, high storage density, optically-readable information carrier with respect to its protection against unintentional scratches, particularly on the read-out side.

The above object is achieved in a disc-shaped, high storage density information carrier that is optically readable from one or both sides by reflection or by transmitted light, in which the information has a microstructure deposited in a concentric, annular surface of the information carrier disc, and in which a concentric, annular ramp-like elevation which provides a protective edge is disposed on the read-out side and in a region outside of the concentric microstructure annular surface, and is characterized in that, in addition to the outside annular ramp-like elevation, the information carrier disc additionally comprises a concentric, circular or, respectively, annular surface-shaped elevation that is structured under given conditions over its surface by way of clearances, exhibiting the elevation at least on the read-out side and in the region inside of the concentric microstructure annular surface.

The present invention is based on the significant perception that scratches can easily occur on the disc surface even when dealing with disc having a protective edge when the disc is unintentionally shifted back and forth on its support because the support is freely not inherently flat and the height of the protective edge is to be dimensioned less than the thickness of the disc for a variety of reasons. It is achieved in an extraordinarily advantageous manner through the provision of an additional elevation in the central region of the disc that even irregularities of the support can practically no longer come into consideration as a source of scratching given dislocation of the disc being read. Particular significance must be accorded the additional elevation in the central region of the disc when the information carrier disc have a relatively large diameter, as is the case, for example, with a video disc. It is not only that irregularities of the seating surface can have a greater influence than in the case of discs having a smaller diameter, for example a digital audio disc, but rather that the disc resting on a protective edge has a tendency to sag in its central region.

Apart from the foregoing, the elevation representing a reinforcement of the central region of the disc can also be advantageous for reasons of stability.

Disc-shaped, high storage density, optically-readable information carriers can be manufactured in the transfer holding process. This is particularly true of the digital audio record known, for example, from the German No. 31 27 993 Al which is manufactured with a diameter of 12 cm. In a further development of the invention, it is proposed for a method for producing compression molds for the fabrication of discshaped, optically-readable information carriers according to the invention in the transfer molding process that the disc regions to be elevated already be provided on the master disc when producing the master disc, from which a father electro-plate is then produced in a galvanic manner and the compression molds are likewise galvanically produced in the standard manner from the father electro-plate via a mother electro-plate.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a plan view of a first exemplary embodiment of the invention;

FIG. 2 is a sectional view of the embodiment of FIG. 1;

FIG. 3 is a sectional view of the embodiment of FIG. 1 in which the disc is constructed for reading information from both sides;

FIG. 4 is a plan view of a modification of the exemplary embodiment of FIG. 1;

FIG. 5 is a sectional view of the disc of FIG. 4; and

FIG. 6 is another sectional view of the disc of FIG. 4 as constructed for double-sided reading of information.

DESCRIPTION OF THE PREFERRED EMBODIMENTS

Referring to FIGS. 1 and 2, an optically-readable information carrier disc 1 is illustrated in a plan view and in section and comprises a transparent plastic having a concentric center hole 2. Information 3 exhibiting a microstructure is disposed on a concentric annular surface, for example in the shape of a spiral track, on that side of the disc lying opposite the read-out side. For protection against scratching, the edge of the information carrier disc 1 on the read-out side comprises an annular rampart-shaped elevation structure comprising a plurality of individual tear-shaped elevations 5 disposed following one another at a predetermined spacing provided by an interstice 4. This tear-like shape has a favorable effect in the manufacture of such information carrier discs in a transfer molding process in view of a low flow resistance. Further, the embodiment of FIGS. 1 and 2 likewise exhibits a concentric, annular elevation 6 about the center hole 2, the annular elevation 6 protecting the read-out side in the region of the concentric annular surface filled by the information against scratches given dislocation of the disc on a support in the same manner as the rampart-like, edge-side elevation. The side of the disc lying opposite the read-out side is generally not in need of such elevations insofar as it is a matter of a digital audio record wherein this side is provided with a label covering its entire surface, since scratches on this side cannot deteriorate the faultless reading process.

Matters are different when the information carrier disc, as shown in section in FIG. 3, is a sandwich disc 10 readable from both sides. It comprises two sub-discs 10a and 10b which are joined at the sides containing the information structure 3. In this case, both sides are read-out sides and are provided with elevations in the central and edge regions in accordance with FIGS. 1 and 2.

Referring to FIGS. 1 and 5, a modification of the structure of FIGS. 1 and 2 is illustrated. In this case, the rampart-like elevation in the edge region comprises a narrow, concentric annular ridge 7 having a rounded profile which is spaced inwardly relative the periphery of the disc. The concentric annular surface 6 according to FIGS. 1 and 2, which is bounded by the center hole 2, is realized here only by way of radial webs 8, also having rounded profile, that follow one another in the circumferential direction at a predetermined circular angle spacing. FIG. 6 illustrates the information carrier disc 10 for a two-sided reading which corresponds to the information carrier disc 1 according to FIGS. 4 and 5. Tear-shaped elevations 5 according to FIGS. 1 and 2 can also be provided in a suitable disposition instead of the webs.

As mentioned above, it is meaningful when manufacturing such information carrier discs 1 or, respectively, 10 by way of the transfer molding process to already provide the desired elevations in the region of the disc edge and of the disc center on the master disc, so that the elevations to be pressed need not be specially shaped for this purpose on the compression molds in special production procedures.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a disc-shaped, high storage density optically-readable information carrier of the type having an access of rotation, and in which an information microstructure is carried on a surface of the carrier in an annular first region concentric of and spaced from the axis of rotation by a second region, in which the carrier has a read-out surface for receiving a light beam, and in which a protective structure is carried by and projects from the read-out surface in a third region located about the first region, the improvement comprising:

a further protective structure carried on and projecting from the read-out surface in the second region, said further protective structure comprising a plurality of angularly-spaced radially-extending members.

2. The improved information carrier of claim 1, wherein:
   said angularly-spaced radially extending members are spaced in a regular pattern.

3. The improved information carrier of claim 1, wherein:
   each of said angularly-spaced radially-extending members is a tear-shaped projection.

4. The improved information carrier of claim 1, wherein:
   the first-mentioned protective structure comprises a plurality of spaced projections.

5. The improved information carrier of claim 1, wherein:
   the first-mentioned protective structure comprises a plurality of equally-spaced projections.

6. The improved information carrier of claim 1, wherein:
   the first-mentioned protective structure comprises a plurality of spaced tear-shaped projections.

* * * * *